United States Patent [19]
Kwon

[11] Patent Number: 5,595,489
[45] Date of Patent: Jan. 21, 1997

[54] ELECTRONIC AUDIO LEARNING APPARATUS

[75] Inventor: Han D. Kwon, Seoul, Rep. of Korea

[73] Assignee: Kemongsa Publishing Co., Ltd., Seoul, Rep. of Korea

[21] Appl. No.: 352,765

[22] Filed: Dec. 2, 1994

[30] Foreign Application Priority Data

Dec. 2, 1993 [KR] Rep. of Korea ................. 93-26228

[51] Int. Cl.$^6$ ........................................... G09B 3/00
[52] U.S. Cl. ................................. 434/319; 434/317
[58] Field of Search ........................... 434/308, 309,
434/317, 319, 322; 364/419.01, 410; 84/470 R,
478, 479 R, 479 A

[56] References Cited

U.S. PATENT DOCUMENTS 4,980,919  12/1990  Tsai .
5,413,486   5/1995  Burrows et al. ................. 434/317
5,437,552   8/1995  Baer et al. ...................... 434/317
5,466,158  11/1995  Smith ............................ 434/317

Primary Examiner—Richard J. Apley
Assistant Examiner—Glenn E. Richman
Attorney, Agent, or Firm—Keck, Mahin & Cate

[57] ABSTRACT

To provide effective, self-learning and fun way to educate children, this electronic audio learning apparatus consists of the sensing section program which are stored in the ROM-pack. The D/A converting section and the piano IC generate audible analog voice output from the ROM-stored digital data and the musical keyboard. These two types of signals are sent to the book/keyboard selection switch to provide users with variety of sound service. The CPU calculates the address of the ROM-pack data/program from the input data detected by the sensing section and the sound effect section. The digital data which is fetched from the ROM-pack is converted to audible voice as it passes through the D/A converting section, LPF, the book/keyboard selection switch, the voice amplifier and the speakers, sequentially.

10 Claims, 10 Drawing Sheets

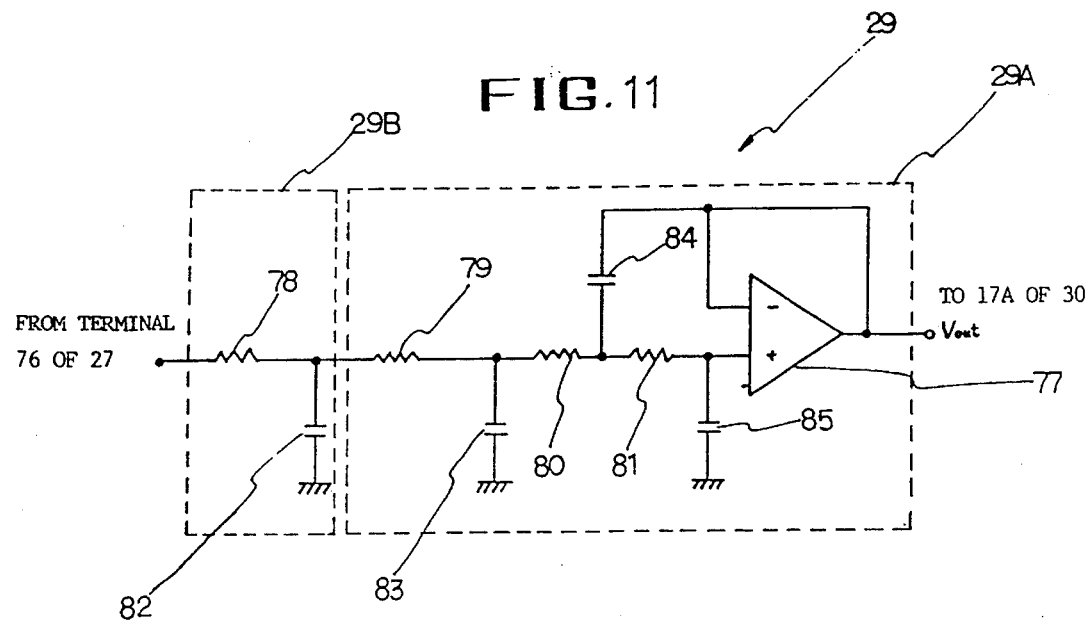

ELECTRONIC AUDIO LEARNING APPARATUS

FIELD OF THE INVENTION

This invention relates to an electronic audio learning apparatus which teaches children to learn and understand the contents of a book/picture-book with the audio help stored in a ROM-Pack.

BACKGROUND OF THE INVENTION

TV, VCR and video games have become common media to children. But most of these products are aimed to market for adults not for children, which leads children to easily meet mass information designed for adults. Further, modern children tend to avoid reading books and are instead fascinated by visually stimulating electronic video games. To overcome this problem, various cassette or video tapes containing verbal narration with background music are produced to attract children's interest in reading. But the children easily lose their interest for these tools because they only provide playing feature of cassette or video tapes. These products cannot repeat specific parts of a story because of slow access time of audio or video tapes. Furthermore, it is almost impossible to memorize millions of currently published books into these products.

On the other hand, some picture books, with voice generating and sensing capability, can perform quite realistic sounds for various animals, machines, instruments, or equipment. However, these products only perform those limited sound effects, and do not have capability of interrupt features as in the present invention.

Computer CD-ROM(Compact Disk-Read Only Memory) technology has solved many of the problems mentioned earlier. But since the computer have CD-ROM capabilities and related softwares, the computer cannot therefore be in a portable size. Yet, it is another question whether the children can operate computers without the help of their parents.

Exemplary of prior art teachings is "language practice set using message card", U.S. Pat. No. 4,980,919. It discloses the following invention: "Language practice set using message card of this invention stores voice signal into memory with different addresses through coding holes. The device of this invention allows a pattern of picture on a card to be interpreted into the equivalent voice meaning by an adult, and is recorded into the language practicing set. When a child inserts one of the message cards into the language practicing set, the voice equivalent to the meaning of the picture shown on the card will be played immediately to provide a combined voice-and-picture teaching result. The devices provide the children with a learning method to link the visual and linguistic education together. The device includes a microphone, memory, voice synthesizer, power amplifier and interface circuit. A message card, a record-replay switch and a start button are also provided. The device of the present invention can also be used as message recorder.

In Australian Patent No. 031,993, the following invention titled "Book with capacity to generate audible sound effects" was introduced. "The book of this invention has page identifying device comprising series of light sensors or contact switches associated with respective apertures of projections. A voice synthesizer is attached to an end cover, and is electrically connected to a series of light sensitive photo sensors. Each of the pages is provided with a significator in the form of one or more apertures. The permutation of the number of the apertures, and the arrangement and spacing of the apertures for each page, differs from page to page. Alternatively, the sensors my be replaced by contact switches, and the apertures by projections. This invention provides enhanced learning as more than one sensor is being used."

In German Patent No. 4,100,001, an invention titled "audiovisual learning apparatus" is introduced.

The audiovisual learning apparatus of this invention illuminates symbols in instruction book using LEDs in the synchronism with audio recording. The aid to the learning of languages or music to structured as an audio visual unit which as instruction book can have either fully or partially transparent pages with symbols. A unit is inserted on the underside of the page and a pattern of LED devices terminate the symbols. The unit responds to a programmed sequence that relates to the specific page displayed on a panel. The program can be provided by a magnetic tape recorder and allows the audio information to be synchronized with the recording.

The above referenced prior art are designed to generate artificial sound with optical sensors or contact switches. But they lack portability and can only provide limited number of sound effects.

SUMMARY OF INVENTION

In view of the foregoing, there exists a need in the art to provide an electronic audio learning apparatus for providing portability and various number of sound effects.

A primary objective of the present invention is, therefore, to provide an electronic audio learning apparatus that is a suitable and effective educational aid specially designed for children.

It is a further object of the present invention to provide an electronic audio learning apparatus which offers variety of knowledge and information to children in easy and effective ways without teachings of their parents or teachers.

It is a further object of the present invention to provide an electronic audio learning apparatus which gives a fun way of learning to children.

It is a further object of the present invention to provide an electronic audio learning apparatus which eliminates the fear of facing new electronic machines to the children such as computer.

It is a further object of the present invention to provide an electronic audio learning apparatus which helps the children to develop their ability to recognize things that they have been taught by the apparatus in their everyday life, and to understand the structure and operation of the computers in a short period of time.

The present invention, "Electronic Audio Learning Apparatus", is designed to overcome the problems in the prior art. Referring to the FIG. 3, the sensing section 4 detects the most recent unfolded book number and page number. To make desired sound output, two sets of the sound effect section 14 on each side of the apparatus, a musical keyboard 21 for piano/organ play, and an electronic circuit board to generate sound from the input sensors or switches, are used. The I/O expansion section 23, a programmable peripheral device interface, connects the sound effect section 14 and the sensing section 4 to the CPU 24. The address decoder 25, which connects the CPU 24 and the ROM-pack 26 which contains the software and digitized voice data, decodes addresses of the ROM to be accessed by the CPU. The D/A converting section 27 transforms digital sound data in ROM into an analog frequency voice data and sends the data to the low-pass filter 29 which only passes through audible frequency sound. The input data from the musical keyboard 21 is also another input data source for the sound effect along with the sensing section 4 and the sound effect section 14. The piano IC 32 generates immediate piano/organ sound, and sends it to the book/keyboard selection switch 17. This invention consists of the electronic circuit section B, the body(housing unit) A which protects the electronic circuit section, and the book 33 which will be placed on the book shelf section 13 and the sensing section 4 of the apparatus. When the filtered sound arrives at the book/keyboard selection switch 17 from the D/A converting section 27, either of the two types of sounds, acoustic data from the ROM-pack 26 or piano sound from the piano IC 32, will be selected by the selection switch 17 and transferred to the voice amplifier 30 for the output from the speakers 22 and 22A.

Further detailed description and each function of the sections will be explained in FIG. 1 through FIG. 13.

BRIEF DESCRIPTION OF THE DRAWINGS

FIG. 11 is a circuit diagram of the low-pass filter of the present invention.

FIG. 12 is a circuit diagram of the voice amplifier of the present invention.

DETAILED DESCRIPTION OF THE PREFERRED EMBODIMENTS

Figure 1:
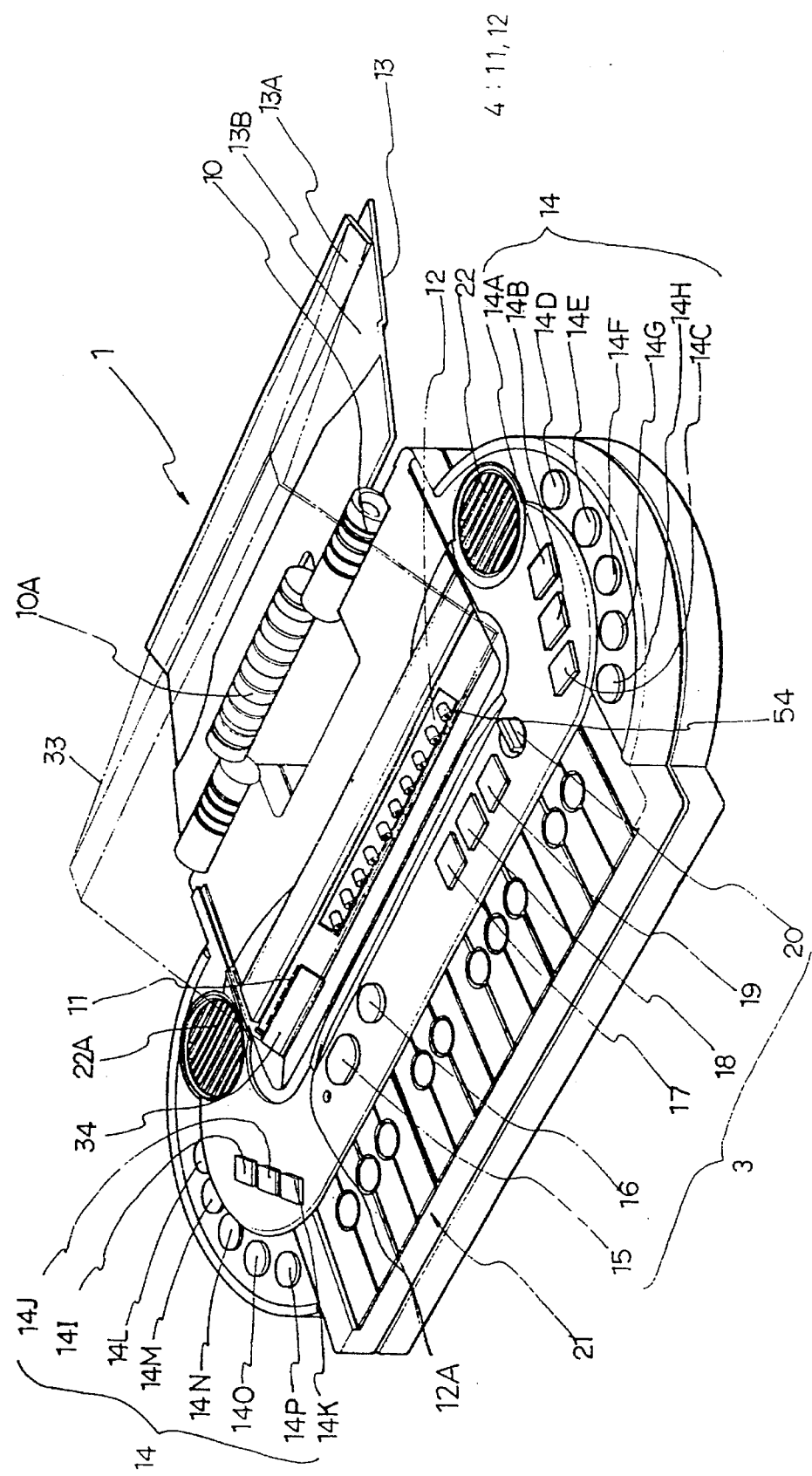
FIG. 1 is a perspective view of the apparatus, in accordance with the present invention.
Figure 2:
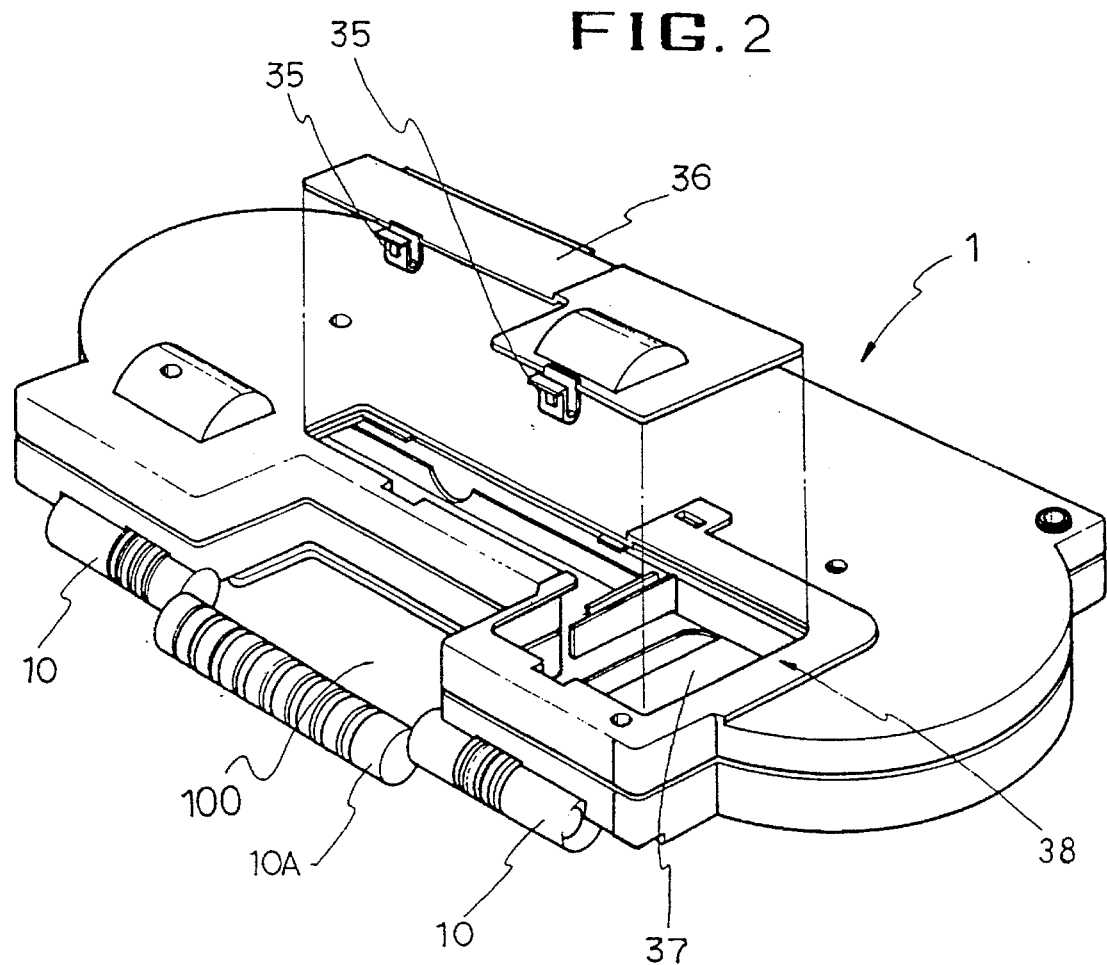
FIG. 2 is a perspective view of the bottom of the apparatus, in accordance with the present invention.
Figure 3:
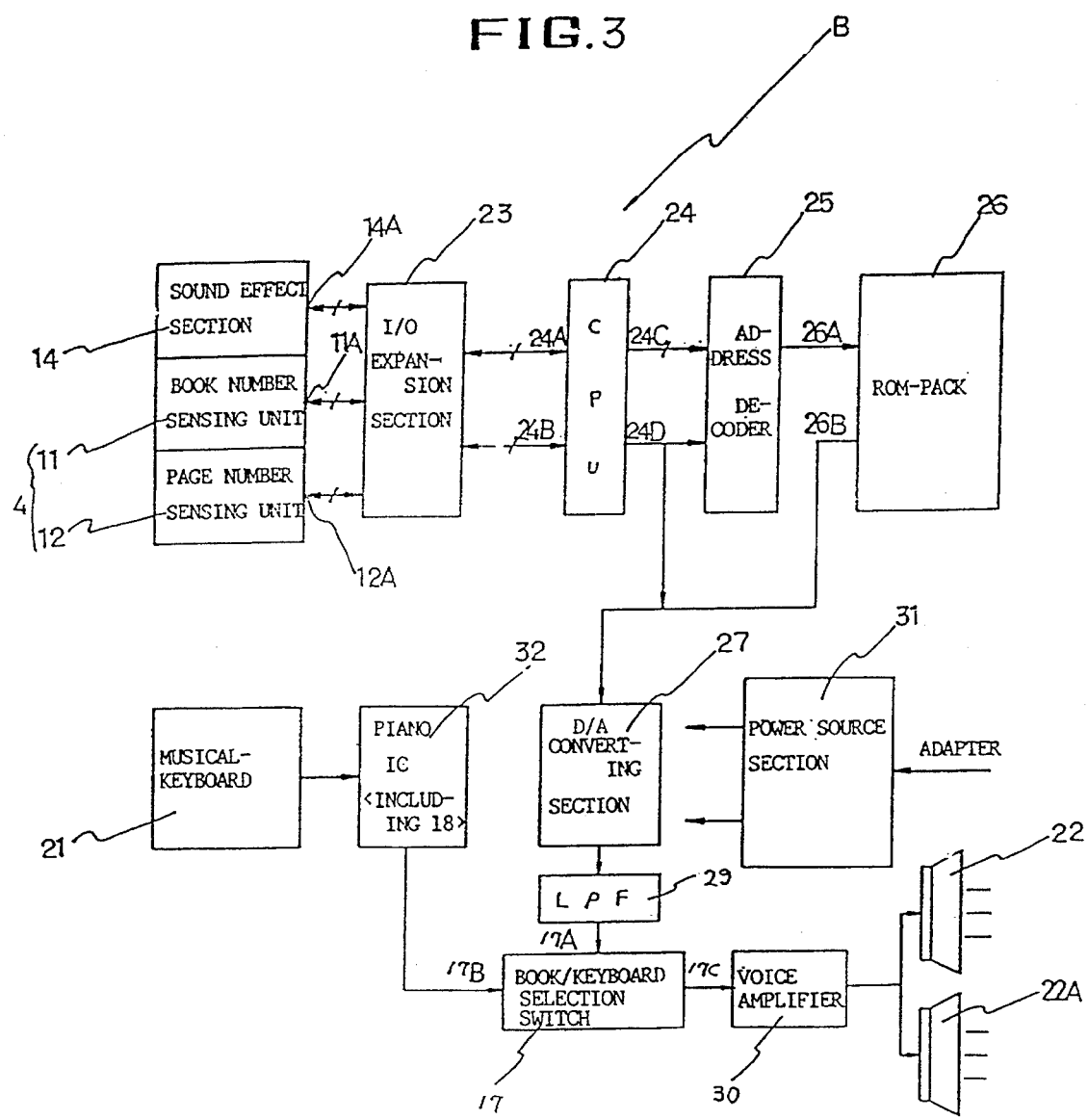
FIG. 3 is a block diagram of the electronic circuits of the present invention.

As shown in FIG. 1, FIG. 2 and FIG. 3, this invention consists of a body 1(housing unit) as shown in FIG. 1, an electronic circuit section installed in the body, a sensing section 4, a book shelf section 13 and a book 33. The book 33 is designed to fit onto the book shelf section 13 and has punched holes to let the sensing section 4 recognize the book number and its current page number.

Figure 6:
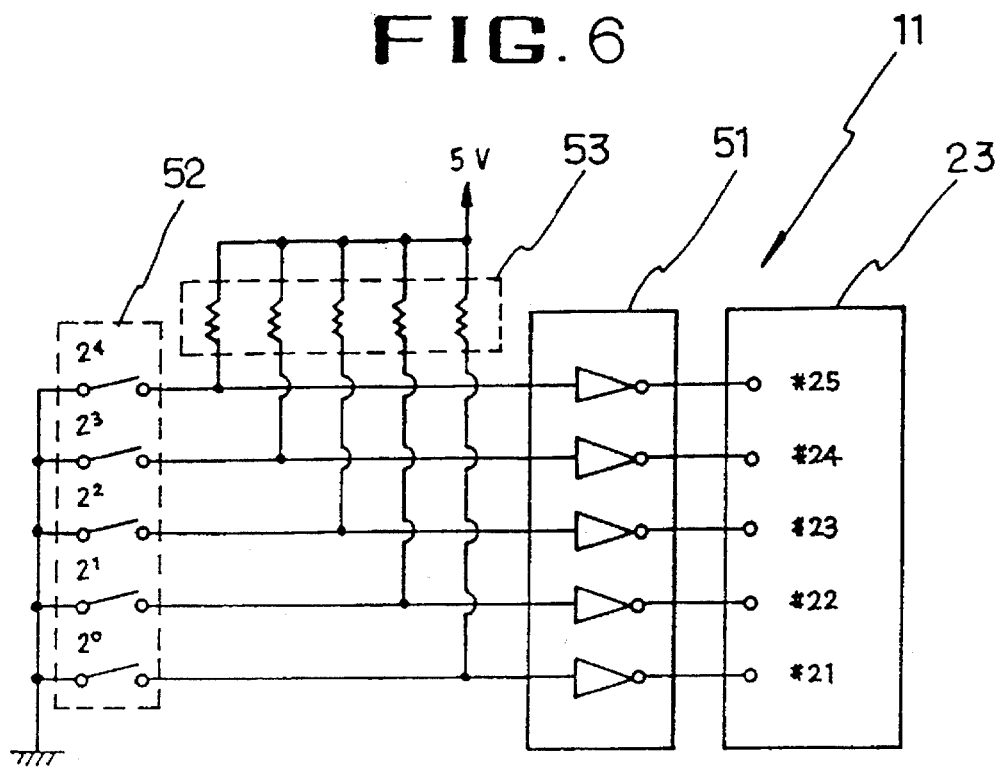
FIG. 6 is a circuit diagram of the book number sensing unit of the present invention.

As FIG. 1 shows, the body 1 is rectangular in shape and has a rounded sound effect section button panel 14 on each side, has the sensing section 4 in the middle of the apparatus to detect and hold the book 33. The body 1 has a concave portion 100 at its upper and rear side which gives a convenient grip and the ROM-pack insertion section 38 on back side which consists of the ROM-pack insertion slot 37, the cover 36, and the cover locks 35 which enables the cover 36 to be freely opened or closed. A bar-shaped hand holder 10 is attached on top of the apparatus which gives a convenient grip(portability) with its opposite concave portion 100 of the body 1. When a user places a book 33 on the apparatus, side of the book is held by the book holder 13A making an angle with the base 13B on top of the apparatus. And a rectangular shape book shelf section 13 can rotate on the hand holder 10 axis covering the sensing section 4 to protect the sensors. The sensing section 4, containing the page and the book number sensors, is installed to fit in the punched holes with a slightly tilted angle. The sensing section 4 consists of the book number sensing unit 11 and the page number sensing unit 12, and is slightly tilted in bottom to top direction in front of the hand holder 10 to easily locate the punched holes on a page 33A of the book 33. The book number sensing unit 11 is a group of contact switches 52, as shown in FIG. 6, which detects a book number by oppressing the page immediately after the user puts the book on the apparatus. In front of the contact switches 52 (See FIG. 6), a rectangular sensing panel 34 as shown in FIG. 1 is installed to hold the inserted page 33A between the contact switches 52 and the sensing panel 34. The page number sensing unit 12 contains the maximum page number of light sensitive photo-transistors 54 that determines page number by light projection through the punched holes. To avoid the faulty detection of the page number caused by a weak illumination projected on the photo-transistors, the designer of the apparatus installed photo-diodes facing the photo-transistors on the projected bar 12A. These photo-diodes directly project lights on each light sensor on a one-to-one basis to work properly even on a cloudy day. On left side of the book number sensing unit 11 and right side of the page number sensing unit 12, there are unique square-shaped buttons 14A–14C and 14I–14K facing front-end middle point of the apparatus and the round-shaped buttons 14D–14H and 14L–14P which are arranged on each side along the round outline of each side of the apparatus. The group of the buttons is called the sound effect section 14. In front of the sensing section 4, there is the operation panel 3 that includes the power switch 15, the start switch 16, the book/keyboard selection switch 17, the piano/organ selection switch 18, the repeat switch 19 and the volume switch 20 with a rectangular shape knob in the middle, and the switches (buttons) are arranged in left to right direction with a space between them. The musical keyboard 21 containing a whole and half tone keys arranged alternately with rubber or plastic switches is in front of the operation panel 3. These rubber switches are the "ON/OFF" contact switches with thin conductible materials at the bottom of each key and the rubber keys have projected keys and the base plate which integrate the keys. When one of the keys is pressed by the user, the conductible material makes connection on circuit board patterns until they release the key. The speakers 22, 22A are on the upper right and the left side of the apparatus for the amplified sound output.

As shown in FIG. 3 when a targeted page of a book is inserted between the sensing panel 34 and the sensors, the sensing section 4 and the output terminals 11A, 12A, 14A of the sound effect section 14 send the book/page number or pressed button information to the I/O expansion section 23. Later this data will be transferred to the control port 24A and data port 24B of the CPU 24. This control and data port of the CPU is connected to the address port 26A of the ROM-pack 26, where the voice data and the operation software is stored through the address decoder 25 which consists of the address expansion unit 25A and the ROM selection unit 25B. The data ports, 24D and 26B are connected to the input terminal 17A of the book/keyboard selection switch 17 through the D/A converting section 27 and the 5-Pole-LPF 29. Later this voice data is instantly sent to an input terminal 17A of the book/keyboard selection switch 17 after the digital/analog conversion and noise filtering process. On the other hand, when a user plays the piano with the keyboard, the sound data source becomes the piano IC 32 instead of the ROM-pack 26's digital sound data. The sound from the piano IC 32 is sent to the input terminal 17B of the book/keyboard selection switch 17 without the filtering and D/A conversion. Finally the book/keyboard selection switch 17 bridges the analog voice frequency to the voice amplifier 30 for the voice output from the speakers 22 and 22A.

Following are each unit section's circuit description of this invention.

To simplify the circuit design, the 8032AH microprocessor or a compatible 8 bit-microprocessor is used for the CPU 24 and 82C55 type dedicated programmable IC is applied to the I/O expansion section 23.

Figure 4:
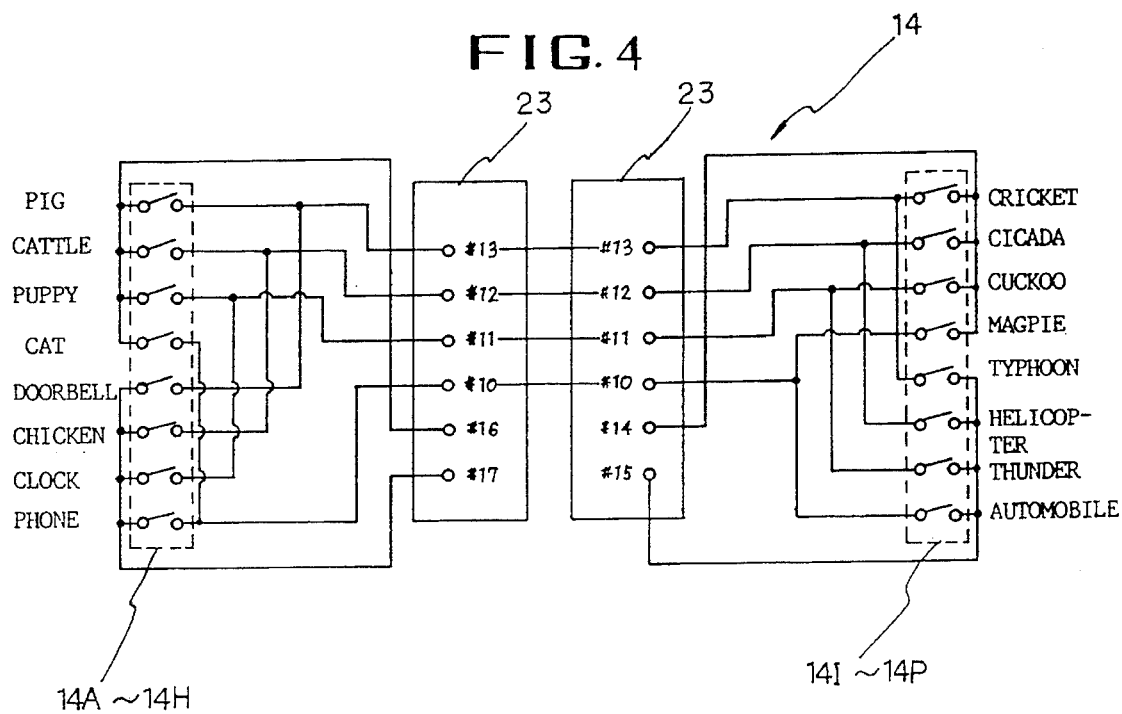
FIG. 4 is a block diagram of the voice generator and the related switches of the present invention.
Figure 5:
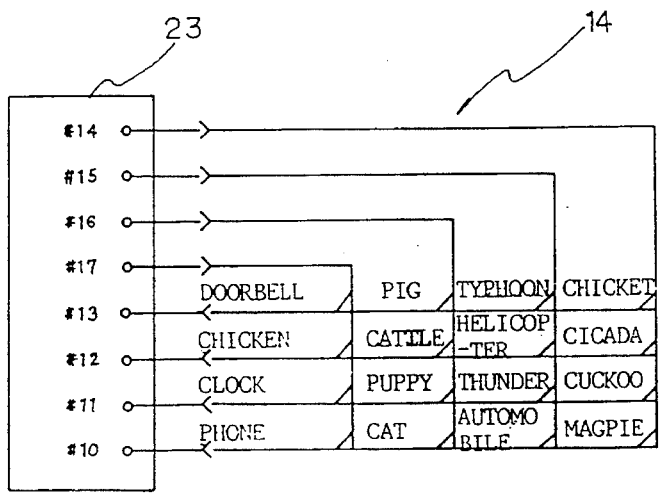
FIG. 5 is a particular example of sounds generated according to FIG. 4 of the present invention.

In this example of the invention, the sound effect section 14 is limited to using 16 buttons 14A–14P with 4×4 matrix structure as described in FIG. 5, a block diagram of the 8255 chip 23 and the sound effect section 14. FIG. 5 is a block diagram showing a particular example of sounds generated according to FIG. 4 of the present invention.

The book number sensing unit 11 is described in FIG. 6. As it shows, this unit consists of groups of inverters 51 such as U30, the contact switches 52 which connects the ground and the input terminal of the inverter 51, and the resistors 53 which connects the (+) terminal of the 5 V DC power and the input terminal of the inverter 51. The contact switches 52 recognize the number of book currently placed on the apparatus as soon as the book presses the contact switches 52. The resistors 53 connect 5 V power to the output line of the contact switches 52. The output terminals of the inverters 51 are connected to each pin #21–#25 of the 8255 chip which is the I/O expansion section 23. When the contact switches 52 pass the 'low' signal to the inverters 51, caused by the insertion of the book, the I/O expansion section 23 will receive a 'high' signal. This series of 'high' and 'low' signals form a machine readable binary number and the apparatus recognizes it as the book number. For example, if the first and fourth positioned holes are punched on the book, the sensors recognize the book as a 9th book because $2^0+2^3=9$.

Table 1 below shows the relation between the punched hole position and sensed book number recognized by the sensing unit 4. 'O' and 'X' represent existence and nonexistence of the punched holes, respectively.

TABLE 1

| Book No. | 5th | 4th | 3rd | 2nd | 1st |
| --- | --- | --- | --- | --- | --- |
| 1 | x | x | x | x | o |
| 2 | x | x | x | o | x |
| 3 | x | x | x | o | o |
| 4 | x | x | o | x | x |
| 5 | x | x | o | x | o |
| 6 | x | x | o | o | x |
| 7 | x | x | o | o | o |
| 8 | x | o | x | x | x |
| 9 | x | o | x | x | o |
| 10 | x | o | x | o | x |
| 11 | x | o | x | o | o |

TABLE 1-continued

| Book No. | 5th | 4th | 3rd | 2nd | 1st |
| --- | --- | --- | --- | --- | --- |
| 12 | x | o | o | x | x |
| 13 | x | o | o | x | o |
| 14 | x | o | o | o | x |
| 15 | x | o | o | o | o |
| 16 | o | x | x | x | x |
| 17 | o | x | x | x | o |
| 18 | o | x | x | o | x |
| 19 | o | x | x | o | o |
| 20 | o | x | o | x | x |
| 21 | o | x | o | x | o |

Figure 7:
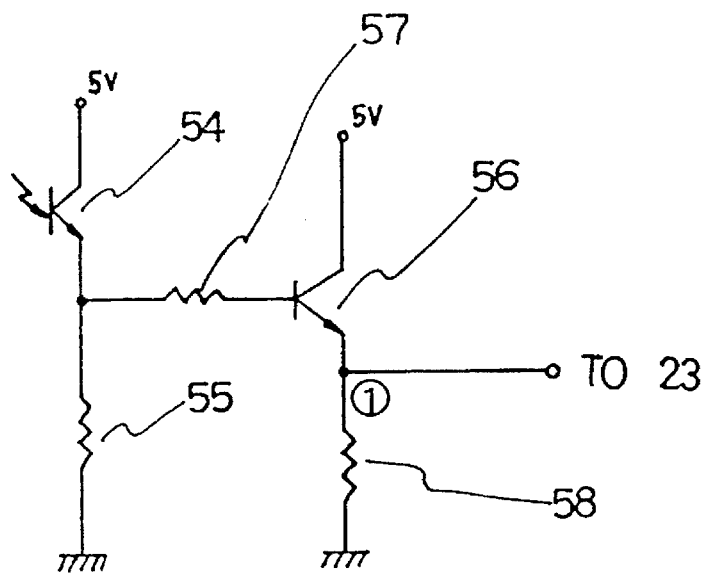
FIG. 7 is a circuit diagram of the page number sensing unit of the present invention.

One embodiment of the page number sensing unit 12 is shown in FIG. 7. The photo-transistor 54 makes a connection to the ground connected resistor 55, while the base of the transistor 56 is connected to the junction of the photo-transistor 54 through the resistor 57. A circuit line which starts from the junction (1) between the transistor 56 and the resistor 58 is linked to the I/O expansion section 23. When the transistor 54 detects a light projection, it passes the 5 V electricity signal to transistor 56 through the resistor 57 which limits the maximum current. The intensity of the illumination projected on the photo-transistor 54 and the current flow between the collector and the emitter of the photo-transistor 54 are proportional to each other. Then finally the 'HIGH' signal is transferred to the I/O expansion section 23. The apparatus will add up all the signals from each sensor and recognize the result as the page number of the book 33. Followings are the resistors and IC types of the transistors used in this FIG. 7; 560 kΩ resistor 55, 330Ω resistor 57, 3.3 kΩ resistor 58, STICL3H photo-transistor 54, and the C1815 transistor 56.

Table 2 below shows the relation between the punched position and the page number detected by the apparatus. 'O' and 'X' represents existence and nonexistence of the punched holes, respectively.

TABLE 2

| | 1ST | 2ND | 3RD | 4TH | 5TH | 7TH | 8TH | 9TH | 10TH |
| --- | --- | --- | --- | --- | --- | --- | --- | --- | --- |
| 1 | O | X | X | X | X | X | X | X | X |
| 2 | O | O | X | X | X | X | X | X | X |
| 3 | O | O | O | X | X | X | X | X | X |
| 4 | O | O | O | O | X | X | X | X | X |
| 5 | O | O | O | O | O | X | X | X | X |
| 6 | O | O | O | O | O | O | X | X | X |
| 7 | O | O | O | O | O | O | O | X | X |
| 8 | O | O | O | O | O | O | O | O | X |
| 9 | O | O | O | O | O | O | O | O | O |
| 10 | O | O | O | O | O | O | O | O | O |

As shown in FIG. 1, the musical keyboard 21 consists of 24 musical keys with a rubber switch installed under the keyboard. Each key was a one-to-one mapping to a dedicated commercial piano IC 32 to generate a specific key tone.

Figure 8:
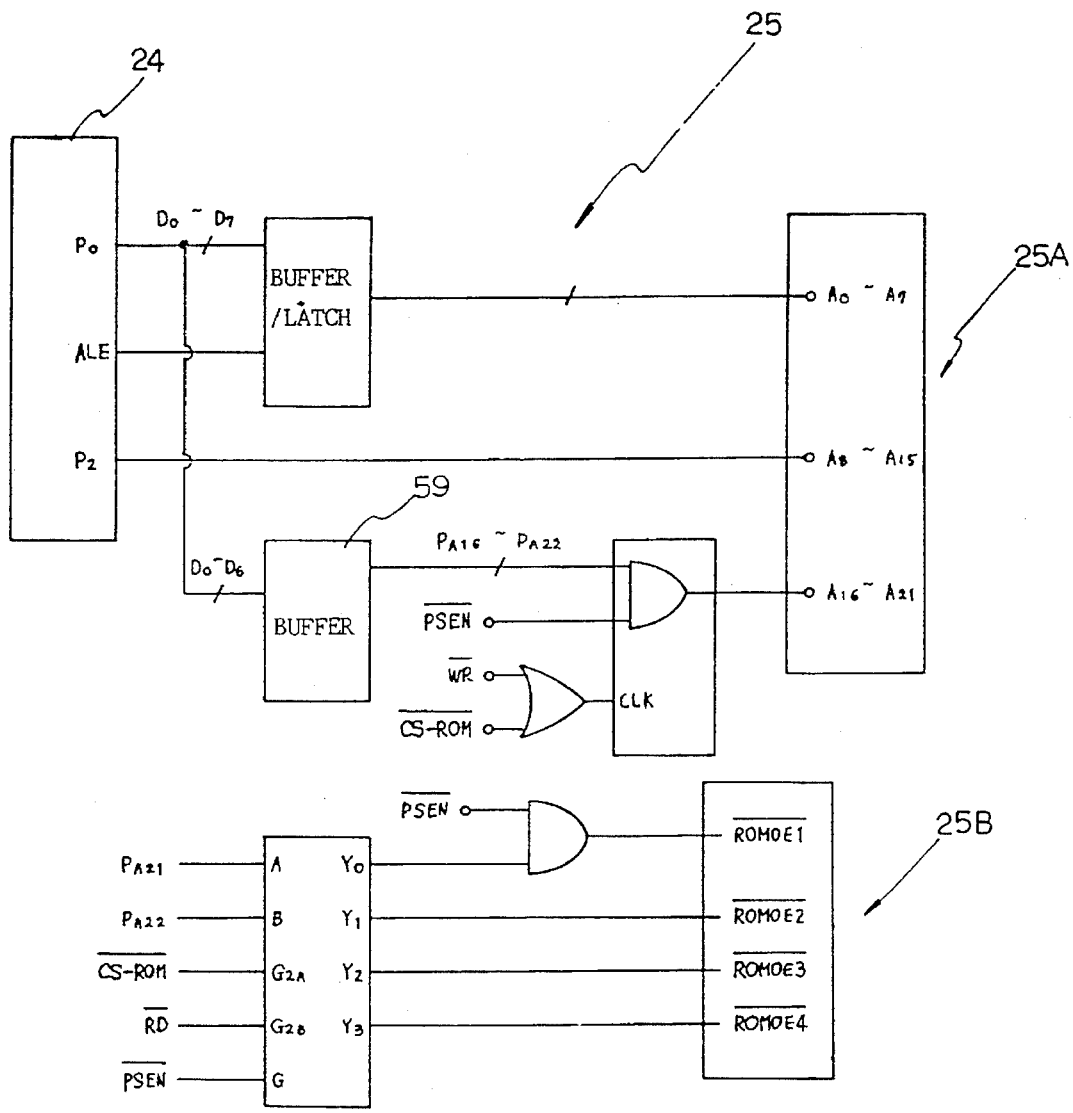
FIG. 8 is a circuit diagram of the address decoder of the present invention.

The address decoder 25, as shown in FIG. 8, consists of an address expansion unit 25A and a ROM selection unit 25B. This is capable of decoding maximum address of four 16 Mbits or two 32 Mbits ROM with 74HC273 buffer 59.

Figure 9:
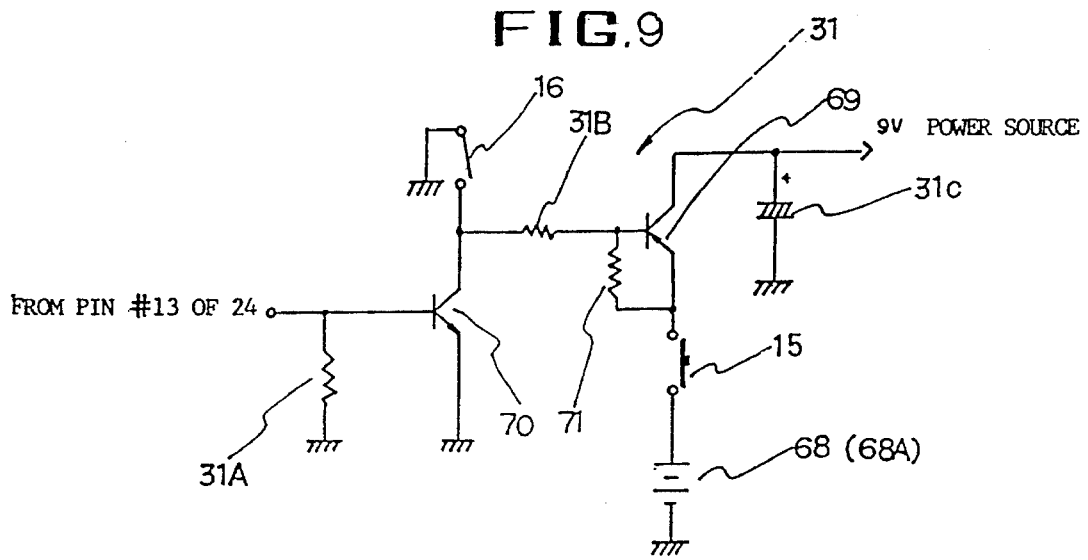
FIG. 9 is a circuit diagram of the power module of the present invention.

The power source section 31 is shown in FIG. 9. The emitter of the transistor 70 is connected to the ground, its base makes a connection to the 13th pin of the CPU 24 and to the ground through the resistor 31a. In the transistor 69, the emitter is grounded through the power switch 15 and (+), (−) terminals of the DC power source 68 and the base makes connection not only to its emitter through the self-biasresistor 71 but also to the collector of the transistor 70 through the bias-resistor 31B. The collector of the transistor 69 is linked to the 9 V power and to the ground through the terminal of the electrolytic-condenser 31C.

In this power source section 31, either six serially connected 1.5 V batteries 68 or a 9 V AC/DC adapter 68A can be used. The 7805 regulator not only converts the 9 V power source into 5 V DC for the logic circuits, but also supplies 9 V DC for the amplifier. To conserve the battery power, if there is no input for 60 seconds, the apparatus software automatically disconnects the power supply. In order to restart the apparatus, the user must turn on the start switch 16 again.

The operation of the power source section 31 is described as follows; When the user turns 'ON' the power switch 15, the electricity is supplied to the emitter of the transistor 69. At this time, the transistor 69 is activated by the ground connection of the base caused by turning the start switch 16 'ON'. From the supplied 9 V power, the regulator transforms the power into 5 V DC to activate the apparatus logic circuits and CPU 24. Then the CPU 24 gives the start signal to the transistor 70 through its #13 pin ensuring the continuous DC power supply for the apparatus. If the apparatus software detects no action, the CPU's 13th pin will send a 'LOW' signal to the transistor 70 to turn off the transistor 70, and a 'HIGH' signal is applied to the base of the transistor 69 through the self-bias resistor 71, shutting down the apparatus power.

Figure 10:
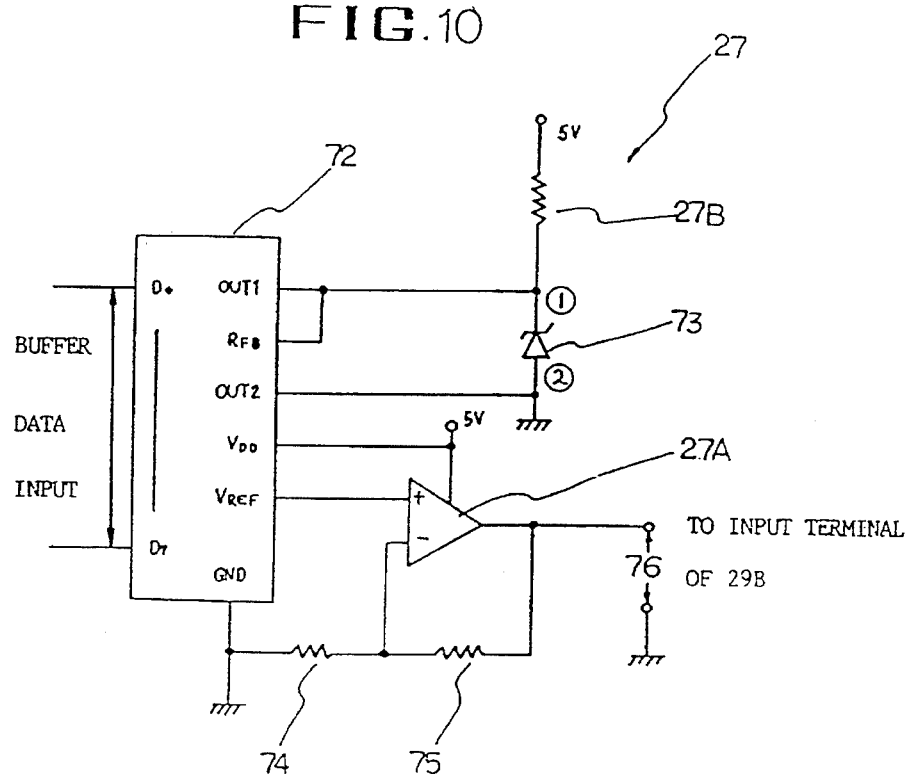
FIG. 10 is a circuit diagram of the digital/analog converter of the present invention.

The D/A converting section 27 is described in FIG. 10. The input data pins DO–D7 in the D/A converter 72 are connected to a data buffer to ease the changes of input impedance of the data line. The output pin OUT1 and the RFB are commonly connected to the junction (1) between the Zener-Diode 73 and the resistor 27B. At the same time, the output pin OUT2 of the D/A converter 72 makes a connection to the junction (2) of the Zener-Diode 73 and to the apparatus ground. In the op-amp 27A, the (+) and (−) input terminal is connected to the external reference voltage application pin VREF of the D/A converter 72 and to the ground pin of D/A converter 72 through the resistor 74, respectively. The (−) input terminal of the op-amp 27A is also connected to its output terminal through the resistor 75. The power terminal of the op-amp 27A is connected to the DC 5 V power source and to DC power source supply pin VDD of the A/D converter 72. At the end, the output terminal 76 makes a connection to the input terminal of the Low-Pass Filter 29B. In addition, the value of the two registers 74, 75 must ensure the maximum of 3 V output in the terminal 76.

The D/A converter 72 over 8bits must have the voltage selection mode to use common power source, and a buffer is connected to input terminals of the D/A converter to enhance precision of the output signal. In addition, the Zener-diode 73 must satisfy the power specification of reference voltage 2.5 V and tolerance ±5 mV, and the 2.2 kΩ resistor 27B is used here.

FIG. 11 describes the low-pass filter 29 which consists of an op amp 77, resistors 78–81 and condensers 82–85. The 3-Pole Chebychev LPF 29A is used for filtering out the digitized-noise and power-noise. But if noise still exists, the RC LPF 29B can be added to this filtering circuit. In addition, the resistors 78–81 and condensers 82–85 must be selected to ensure cut-off frequency 3.8 kHz of the LPF 29.

FIG. 12 describes the book/keyboard selection switch 17 and the amplifier 30. This switch selects a voice output from either the LPF 29 or the piano IC 32 to send the selected signal to the voice amplifier 30. Because of the selection of switch 17, the apparatus does not require two separate voice amplifiers. Since it uses a LM386 op-amp 86, resistors and capacitors used for this voice amplification must be selected to be able to drive 8Ω speakers 22 and 22A. The variable-resistor 20 controls the loudness of the sound, and parallely connected resistors 88 and 20 limit the maximum sound output from the speakers 22 and 22A.

Values of 4.7 kΩ, 1.2 kΩ and 10Ω for the resistors 89–91, 104 u, 10 u, 0.1 u and 473 u for the condensers 92–95, and 100 u and 220 u for the electrolytic-condensers 96, 97 are used in FIG. 12.

The address decoder 25 as shown in FIG. 8 consists of the address expansion unit 25A and the ROM selection unit 25B, and it can access either four 16 Mbit or two 32 Mbit ROM since it has 64 Mbit accessing capability. The ROM-Pack contains both the application program and the digitized voice data which are to be accessed by the CPU 24.

Figure 13:
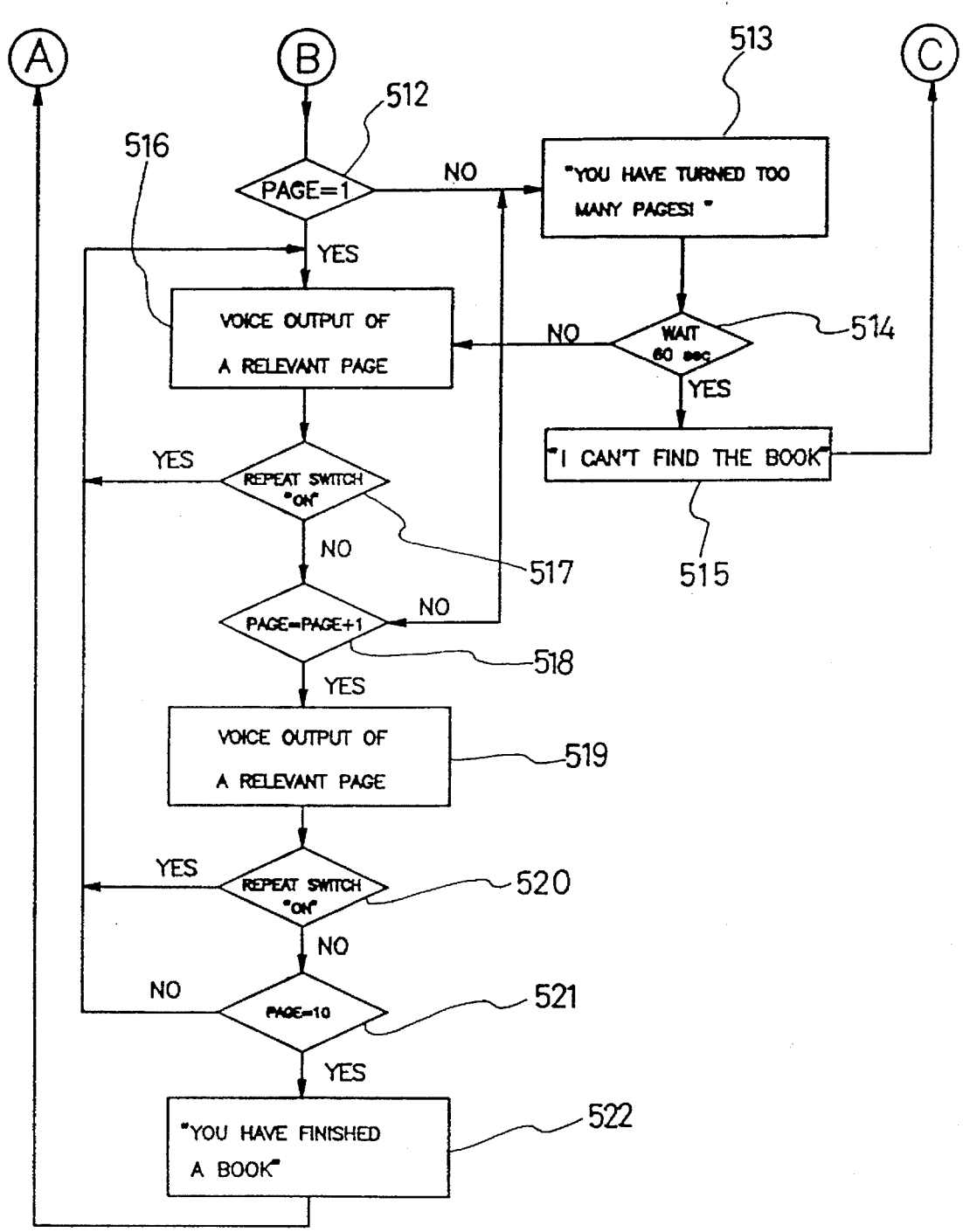
FIG. 13 and 13a are a software program flow-chart of the present invention.
Figure 13A:
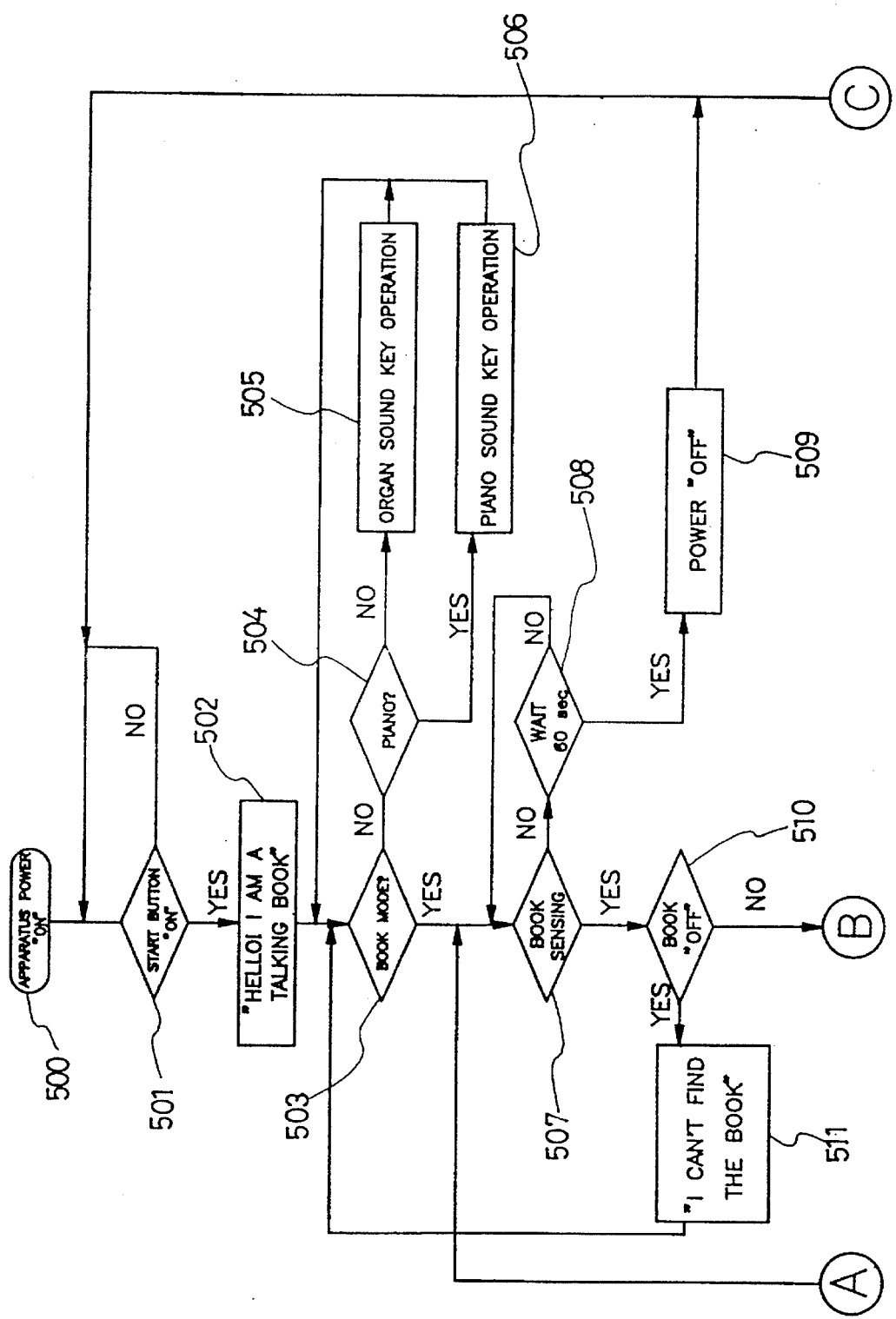

The program flow-chart of this invention's software is described in FIG. 13 and FIG. 13a. Starting from step 500, when a user turns on the apparatus power with the power switch 15, the software program immediately starts checking if the Start Button 16 is 'ON' at step 501. If the start button 16 is 'ON', the apparatus announces the start of the apparatus by saying "Hello! I am a talking book!" in step 502. Otherwise, the apparatus waits until the start button 16 is 'ON'.

In step 503, the program flow branches into two procedures according to the status of the book/keyboard selection switch 17. If the apparatus is in "book mode" the software jumps to step 507, otherwise it jumps to step 504. In step 504, the piano/organ mode of the apparatus is determined. If the result of the condition is 'YES', the apparatus plays the piano sound in step 506. Otherwise, the apparatus plays the organ sound in step 505. After step 506 and 505, the software flow jumps to the previous step 503.

Steps 507, 510 and 512 are each decision makers for tests. Step 507 checks the placement of the book on the apparatus. If the book is not recognized by step 507, the apparatus waits 60 seconds before shutting down of the power in step 509, and jumps back to the step 501. In case where the book is found by the apparatus sensors before the 60 seconds in step 508, it returns back to step 507.

Step 510, checks for the insertion status of the book. If the book 33 is not on the book shelf section 13 or improperly placed on the apparatus, it will make an announcement through the speakers 22 and 22A, as "I can't find the book!" in step 511.

In step 512, the page number sensing unit looks for the first page the book. If the currently displayed page number is not the first one, the apparatus will warn the user by the announcement, "I can't find first page!" in step 513 and will then jump to step 514. If the page number is 1, the procedure proceeds to step 516 and the apparatus fetches the digital voice data from the ROM and converts it into the acoustic voice output and continues to step 517.

In step 514, the software checks for the 60 seconds wait time. If the condition is 'YES', it jumps to step 501 after it announces "I can't find the book!" Otherwise, it continues to step 516.

Step 517 shows the repeat feature of the apparatus. This can be set or reset by the repeat switch 19. If the repeat switch is 'ON', the apparatus software goes back to the 516 and repeats the current page's announcement. But if the repeat switch 19 is 'OFF', then the procedure goes to the next step 518.

In step 518, the apparatus checks if the user has turned to the next page of the book. In a case where two or more pages are turned by the child accidentally, the apparatus will warn the user by saying "You have turned too many pages!" in step 513, otherwise, it jumps to step 520 after the voice output in the step 519.

In step 520, the apparatus checks for the 'ON/OFF' state of the repeat switch 19 as shown in FIG. 1. If the switch is 'ON', the software program jumps to the previous step 516 or continues to step 521 otherwise.

In step 521, the apparatus checks for the last page of the book 33. As soon as it scans the page number 10, the last page of the book, from the page number sensing unit 12, it will announce "Congratulations! You have finished a book". But if not, the procedure goes back to step 516.

To summarize the operation of this invention, first a user places the book 33 between the book shelf unit 13 and the sensing section 4 and turns to first page of the book. One side of the book is placed on the sensors and the other is held by the book holder 13A. Then, the child operates buttons on the operation panel such as the power switch 15, the start switch 16, the book/keyboard selection switch 17, piano/organ selection switch 18 and the volume switch 20. If the book/keyboard selection switch 17 is in the "Book Mode", it generates acoustic information of a currently displayed book on the apparatus through the speakers 22,22A. But, if the user has selected the "Keyboard Mode", it will play the piano/organ as the child hits the keyboard. In addition, when the user turns on the start switch 16 or when the book 33 is taken off from a proper position, the learning apparatus greets or warns the user with an audio output.

What is claimed is:

1. An electric audio learning apparatus comprising:

a main body;

a musical keyboard on said main body;

an operation panel on said main body including a selection switch and switches for controlling said apparatus;

a sensing section in said main body for detecting book and page numbers;

a book shelf section on said main body for placing a book;

a sound effect section in said main body for selecting sound effects;

speakers for emitting sound effects attached to said main body; a ROM-Pack;

a ROM-Pack insertion section in said main body for inserting a ROM-Pack, said ROM-Pack having sound data corresponding to said indicia of said pages of said book;

a power source for supplying power to said apparatus; and an electronic circuit section in said main body powered by said power source for generating voice or sound output based on the input data from said operation panel, wherein said sensing section, said sound effect section, said musical keyboard, and said circuit section further comprising: said electronic circuit comprises a book number sensing unit for outputting a book number to an I/O expansion section from a connection of contact switches caused by oppression of a book; photo-transistors for detecting the existence of punched holes by light projection; a page number sensing unit for detecting a page number from the existence of holes on a book sensed by said photo-transistors; an I/O expansion section for receiving outputs of said book number sensing unit, said page number sensing unit and said sound effect sensing section; an address decoder in said electronic circuit section for decoding an address; a CPU for receiving output of said I/O expansion section through a control and data port, a data and address port of said CPU is connected to an address port of a ROM-Pack through said address decoder; a low path filter for receiving a data port from said D/A converting section; a book or keyboard selection switch unit for receiving a data port which is connected between said CPU and said address decoder through a D/A converting section and said low path filter, said book or keyboard selection switch is receiving output of a piano IC; and a piano IC for receiving an output of said musical keyboard unit; when said selection switch is in the book mode, said learning apparatus produces acoustic information, when a book is placed on the book shelf section and the sensing section, the sensing section producing an acoustic output from the ROM-Pack, corresponding to the indica on the page of said book, and when said selection switch is in the keyboard mode, the learning apparatus will produce a selected sound effect as the user plays the keyboard.

2. An electronic audio learning apparatus according to claim 1, further comprising a hand holder attached to said main body containing a protruded grip.

3. An electronic audio learning apparatus according to claim 1, wherein said main body includes a concave portion for allowing easy grip.

4. An electronic audio learning apparatus according to claim 1, wherein said book shelf section includes a base for rotating on a hand holder axis covering said sensing section, a book holder for holding a bottom side of a book which makes an angle with said base.

5. An electronic audio learning apparatus according to claim 1, wherein said ROM-pack insertion section comprises a ROM-Pack insertion slot, a cover lock, and a cover.

6. An electronic audio learning apparatus according to claim 1, wherein said power source section comprises;

a first transistor in which an emitter is connected to a ground of apparatus, a base is connected to a pin of said CPU and a ground through a resistor, a collector is grounded through a start switch; and a second transistor in which an emitter is connected to a ground through a power switch, (+) terminal and (−) terminal of a DC power source, a base is connected to its emitter through a self-bias-resistor and to a collector of first transistor through a bias-resistor, a collector is connected to 9 V power line and to a ground through (+) and (−) terminals of a electrolytic condenser.

7. An electronic audio learning apparatus according to claim 1, wherein said operation panel comprises a power switch, a start switch, a book and keyboard selection switch, a piano or organ selection switch, a repeat switch for repeatedly listening the content of a book, and a volume switch.

8. An electronic audio learning apparatus according to claim 1, wherein said sensing section comprises a book number sensing unit in which a sensing panel is arranged in a space with opposite sensors and holds the page of a book between that space, and a page number sensing unit in which light sensitive photo-transistors are serially installed in round shape holes and photo-diodes are installed on a projected bar.

9. An electronic audio learning apparatus according to claim 1, wherein said sound effect section comprises square shaped buttons diagonally arranged on said main body and round shaped buttons arranged on each side along the round outlines of said body.

10. An electronic audio learning apparatus according to claim 1, wherein said D/A converting section comprises a digital/analog converter in which data input pins are connected to buffers to ease the changes of input impedance, output pin OUT1 and $R_{FB}$ are connected to a junction of a terminal of Zener-diode and to a DC power source through a resistor, an output pin OUT2 is connected to the other terminal of said zener-diode and to a ground, an amplifier with op amp in which an (+) input terminal is connected to the D/A convert's external reference voltage application pin $V_{REF}$ and an (−) input terminal is connected to the D/A converter's ground pin GND through a resistor and to an output terminal through a resistor, a power supply terminal is connected to DC power source and to a dc power supply pin $V_{DD}$ and an output terminal is connected to input terminal of said LPF and resistors which have their resistance to meet maximum of 3 V at said output terminal.

* * * * *